Patented June 17, 1930

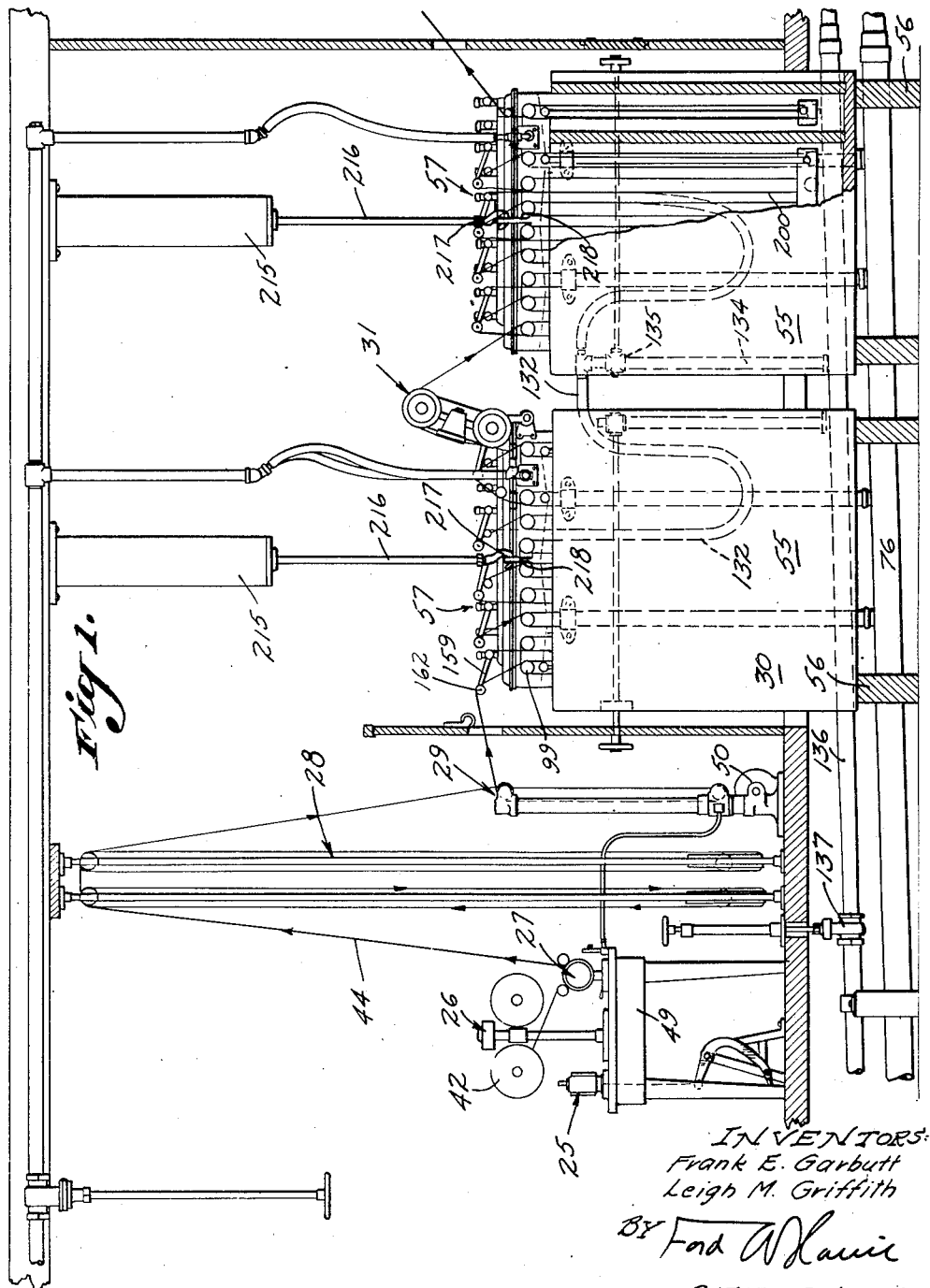

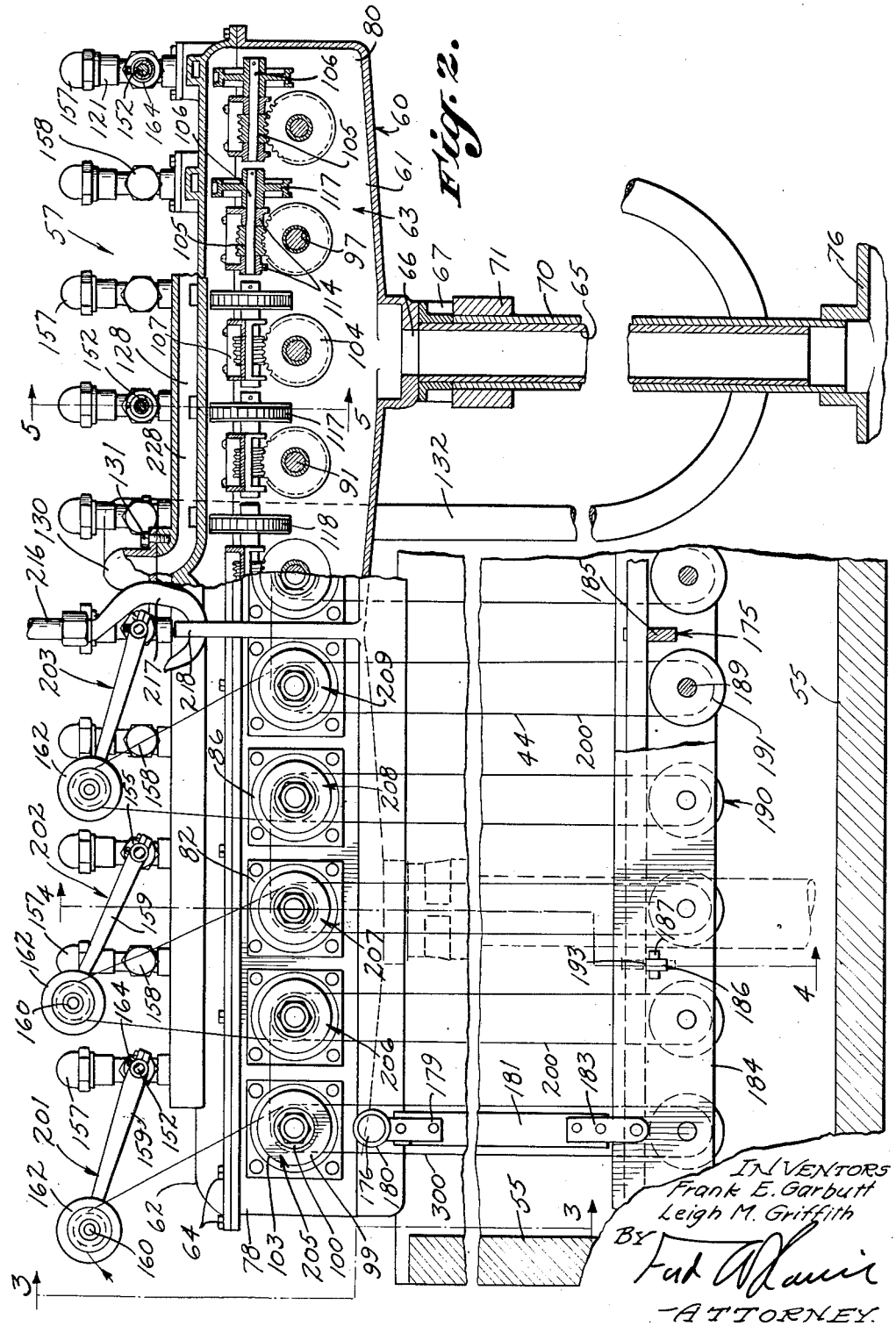

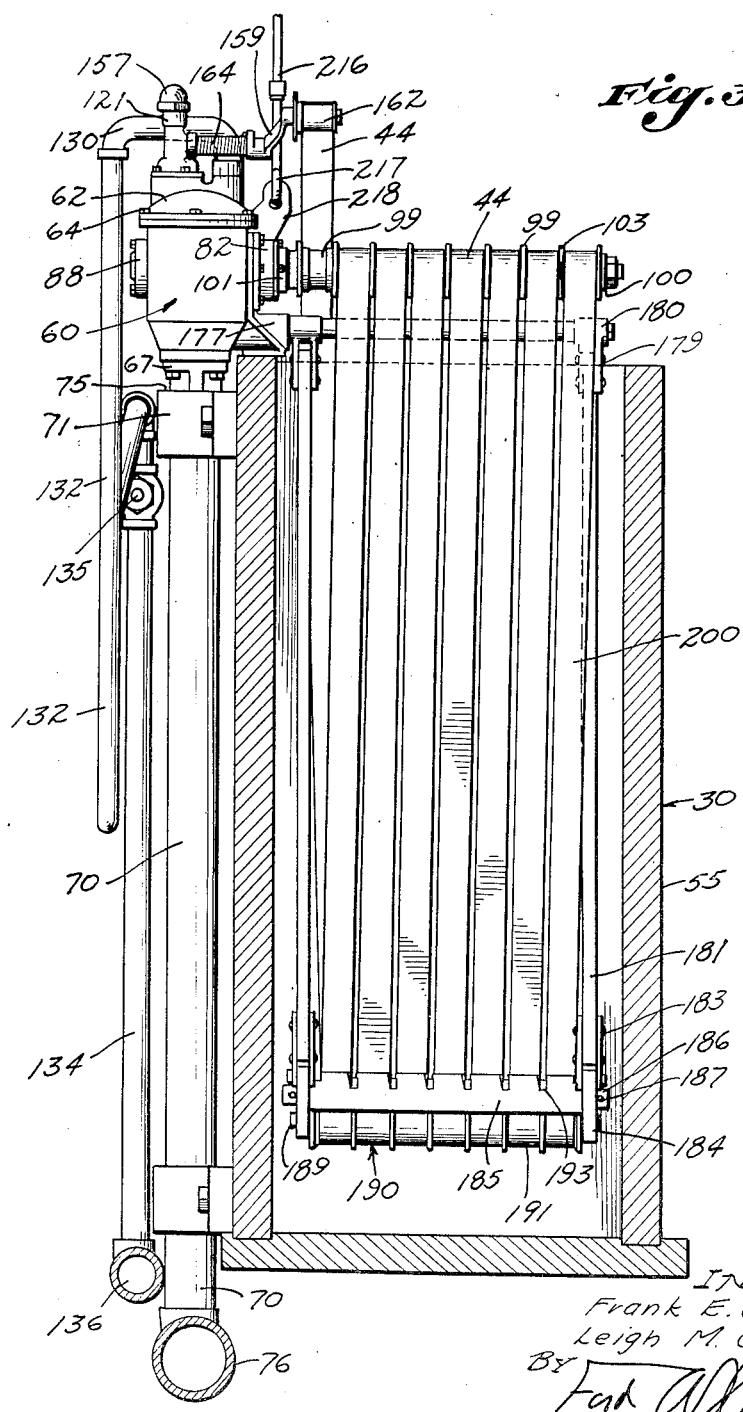

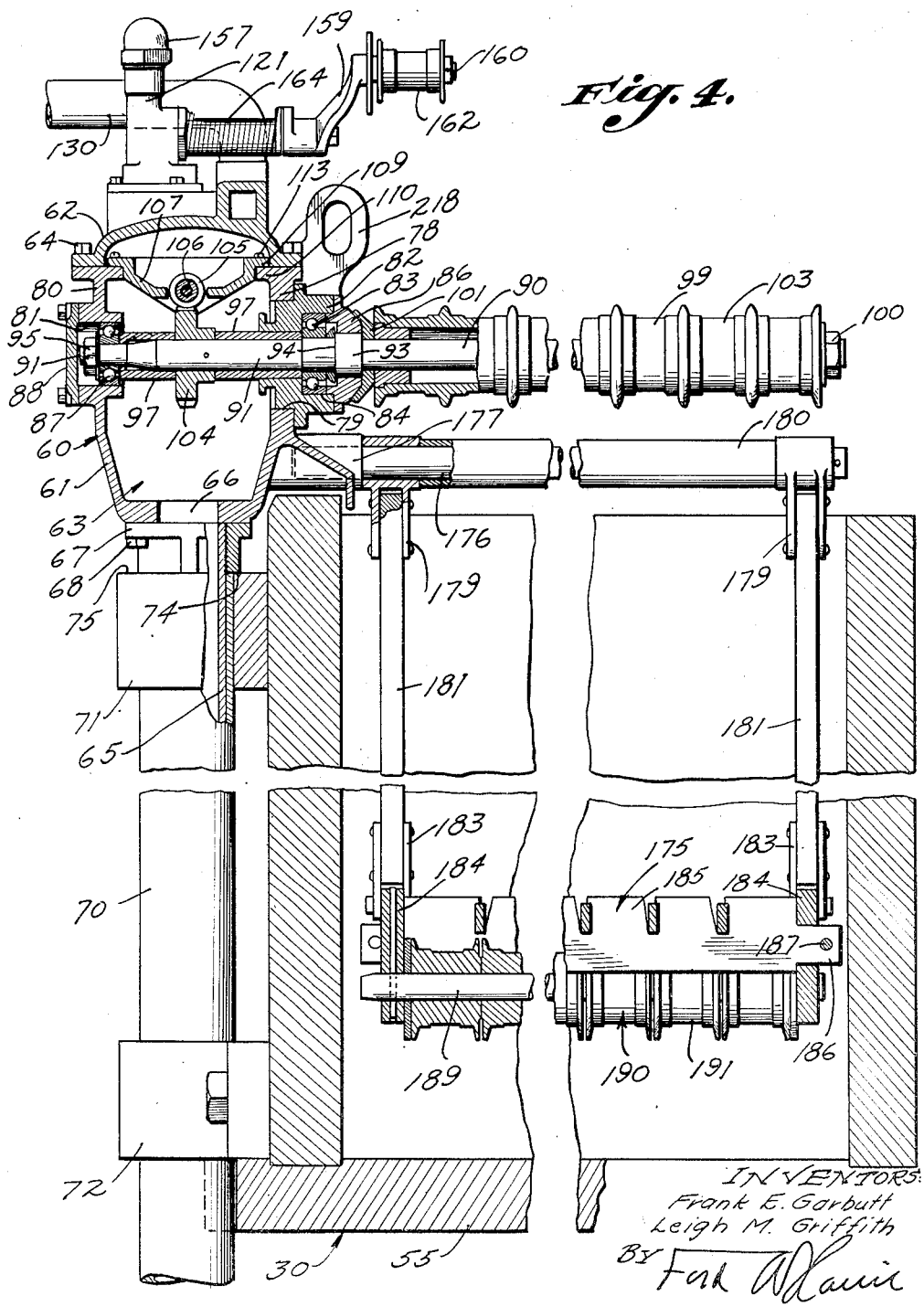

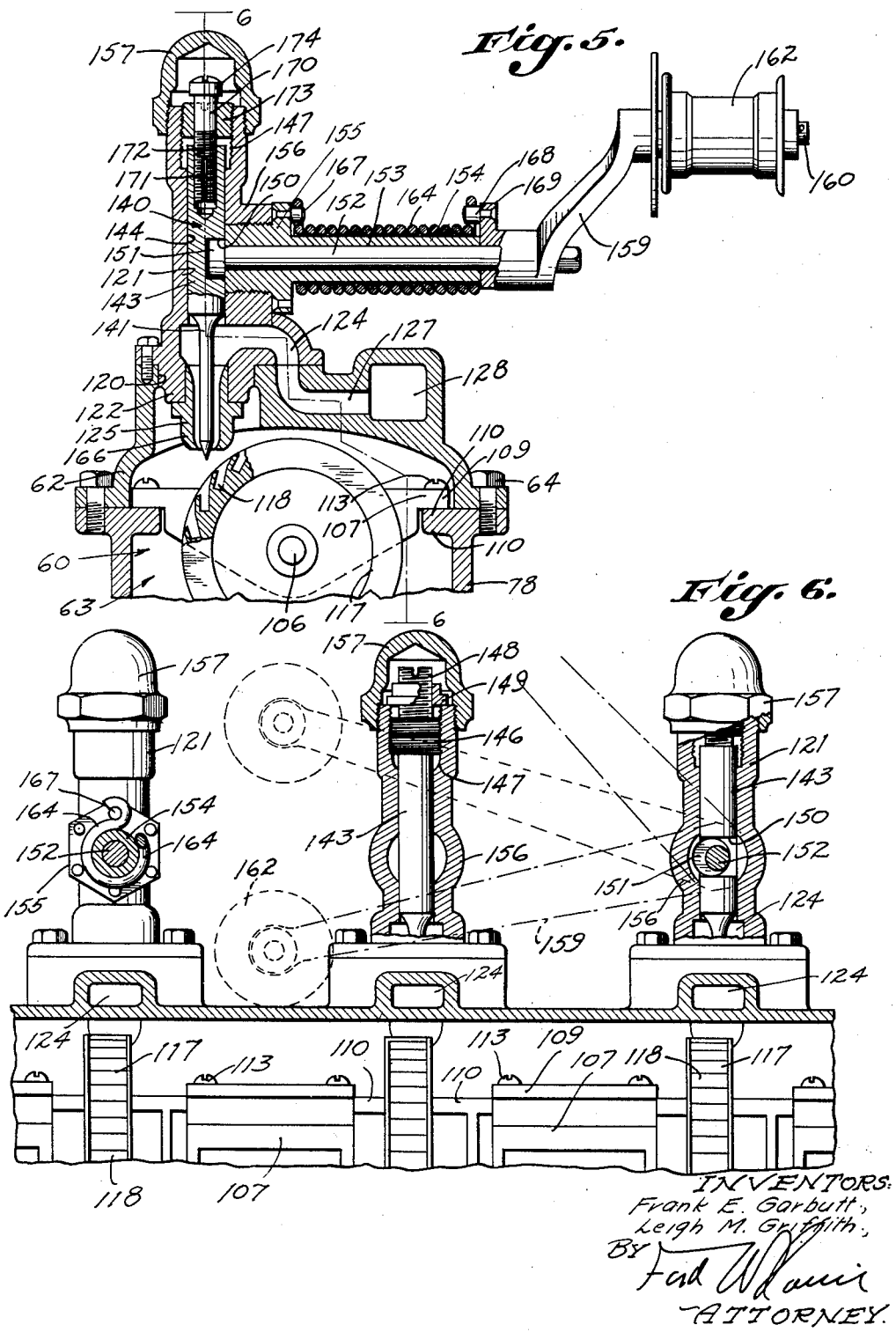

1,764,203

UNITED STATES PATENT OFFICE

FRANK E. GARBUTT AND LEIGH M. GRIFFITH, OF LOS ANGELES, CALIFORNIA, ASSIGNORS TO PARAMOUNT FAMOUS LASKY CORPORATION, OF NEW YORK, N. Y., A CORPORATION OF NEW YORK

STRIP-FEEDING MECHANISM FOR MOVING-PICTURE FILMS

Original application filed April 26, 1926, Serial No. 104,609. Divided and this application filed November 7, 1927. Serial No. 231,475.

This application is a division of our application entitled Film developing machine, filed April 26, 1926, Serial No. 104,609.

Our invention relates to film developing machines in which the film is fed over suitable rollers through various tanks for the purpose of performing the developing, fixing, washing and drying operations thereon. The film during these operations expands and contracts, and the invention is so constructed that it automatically compensates for such expansion and contraction and maintains a substantially uniform tension on the film at all times. This is important since the film must be maintained under a minimum tension to prevent the film buckling against the walls of the apparatus or against itself, and to prevent kinking. At the same time the mechanical strength of the film is small and we provide means by which the maximum tension to which the film can be subjected is strictly limited. This prevents the film from being broken or distorted by the application of too much tension thereto.

The problem of maintaining the film under uniform tension in such continuous developing machines has been long recognized, and previous inventors have sought to solve this problem by providing means adapted to drive the film at a speed somewhat higher than that desired and then allowing the film to be frictionally driven so that there is a constant slippage whenever the tension on the film exceeds a safe maximum value between the film itself and its driving means or between suitable friction surfaces between the film and the ultimate driving means. All such frictional drives with which we are familiar are unsatisfactory due to variations in friction under the conditions of operation met in practice, so that such machines need constant attention and frequent repairs and are most unsatisfactory from a user's viewpoint.

It is an object of our invention to provide a continuous film developing machine in which the film is positively driven at intervals through the machine by driving means whose driving force is fixed within such limits that a uniform tension is maintained on the film, and which is so constituted that the film is driven faster or slower whenever it is necessary to maintain this tension. This we accomplish without using friction or friction clutches, the driving force being automatically regulated to maintain a uniform and definite tension on the film, regardless of its speed. In the embodiment of the invention shown herein, we employ a plurality of impulse wheels operated by fluid jets whose force may at all times be accurately regulated to provide uniform tension on the film. Such an arrangement automatically compensates for any shrinkage or expansion of the film.

By employing driving means which pull uniformly on the film regardless of its speed, we are able to regulate the speed of the machine by positively controlling the rate at which the film is fed into the machine at its intake end. If this rate is increased, the impulse wheels automatically speed up to maintain the tension; and if the rate is greatly reduced, there is no increase in tension on the film. Our invention is broadly new and basic in that it employs means for positively driving the film at uniform tension regardless of speed variations. It is also broadly new and basic in that the rate of feed through the machine is regulated by the rate at which the film is fed into the intake end of the machine, which automatically adjusts itself to this rate.

It is a further object of our invention to provide at the intake end of the machine positive means for accurately regulating the rate of feed into the machine and thus, as explained above, providing means by which the operator may regulate the rate of feed in the machine itself.

Other objects and advantages of this invention will be thoroughly explained in the following description taken in connection with the drawings which illustrate our invention.

Referring to these drawings,—

Fig. 1 is an elevational view of a film-developing apparatus using the strip-feeding mechanism of our invention.

Fig. 2 is a fragmentary and partially sectioned view of a film-handling unit embodying the features of our invention.

Fig. 3 is a partially sectioned view taken on the line 3—3 of Fig. 2.

Fig. 4 is a sectional view taken on the line 4—4 of Fig. 2.

Fig. 5 is a section taken on the line 5—5 of Fig. 2.

Fig. 6 is a sectional view taken on the line 6—6 of Fig. 5.

The form of our invention shown in the drawings consists of a splicer 25, a film feed device 26, a combined branding machine and brake 27, a film take-up 28, a film feed regulator 29, a wet box 30 and a film inspection device 31.

The splicer 25 and the film feed device 26 form no part of the present invention. The latter may be any type of film feed which carries a film reel 42 from which a film 44 is adapted to be unwound.

The branding machine and brake are shown and described in detail in our co-pending application entitled Branding machine, filed April 26, 1926, Serial No. 104,610, to which reference may be had if desired. The splicer 25, the film feed device 26, and the branding machine and brake are all carried on a table 49. The film 44 passes from the film feed 26 through the branding machine 27 and then to the film take-up 28. This film take-up does not constitute a part of the present invention, and is described in our co-pending application entiled Film developing machine, filed April 26, 1926, Serial No. 104,609. Essentially this film take-up mechanism consists of a series of rollers around which the film 44 is passed. Certain of these rollers are floating, so that should it be desired to splice the film 44, that portion of the film preceding the film take-up could be stationary while that portion of the film succeeding the film take-up might still move, this action being made possible by the floating rollers.

The film 44 passes from the film take-up 28 to the film feed regulator 29. This regulator is described in detail in our co-pending application entitled Film developing machine, filed April 26, 1926, Serial No. 104,609. Essentially this film feed regulator consists of a mechanism for determining the rate of speed at which the film 44 passes into the wet box 30. It has an electric motor 50 which is of the variable speed type. This motor is provided with certain speed recording instruments which record to the operator the speed of the film 44 as it leaves the film feed regulator 29. This speed is variable by varying the speed of the motor 50.

The essential features of this invention are embodied in the wet box 30 are best shown in Figs. 2 to 6 inclusive. Referring to these figures the wet box 30 includes tanks 55 which are supported by foundations 56. The tanks may be divided into various compartments in which the various solutions for treating the film are retained. In each of the tanks 55 is a film-handling unit 57. One of these units is shown clearly in Figs. 2 to 6 inclusive. Each of the film-handling units consists of an impulse turbine case 60 which includes a shell 61 and a cover 62. The shell 61 provides an elongated chamber 63 which is open at its top. The cover 62 is secured to the upper part of the shell 61 by cap screws 64 in order to close the upper open end of the chamber 63. Vertical drain tubes 65 extend downward from the turbine case 60 and are secured to the shell 61 in communication with openings 66 thereof by means of shoes 67 these shoes 67 being secured to the shell 61 by cap screws 68. The vertical tubes 65 of each of the film-handling units 57 telescope inside a vertical pipe 70, these vertical pipes 70 being rigidly held at the side of a tank 55 by means of upper and lower brackets 71 and 72 respectively. Lower faces 74 of the shoes 67 engage upper faces 75 of the upper brackets 71 and in this manner the film-handling units are supported. The lower ends of the vertical pipes 70 connect to a drain pipe 76 as shown in Fig. 1. This drain pipe 76 is placed below the floor on which the table 49 rests. By extending the drain tubes of the film-handling units inside the vertical pipe, the units are retained in proper working position.

Referring more particularly to Fig. 4, a front wall 78 of each of the shells 61 is provided with a plurality of front cylindrical openings 79, and a rear wall 80 of each of the shells 61 is provided with a series of cylindrical openings 81 which align with the openings 79. A bearing holder 82 is secured in each of the front openings 79, and a bearing 83 is secured in cavities 84 of each of the bearing holders 82 by means of a retaining cap 86. In each of the back openings 81 there is placed a bearing 87 which is accessible when a cover 88, which closes each of the openings 81, is removed.

Each pair of bearings 83 and 87 is adapted to rotatably support an upper drive shaft 90. An inner end 91 of each drive shaft 90 extends into the chamber 63 and carries inner races of the bearings 83 and 87 secured thereto. Each shaft 90 is enlarged at 93 so as to provide a shoulder 94. The bearings 83 and 87 are secured in place by means of a nut 95 which is secured on the inner end of each of the shafts 90, the bearings being clamped between the nut 95 and the shoulder 94. Spacers 97 are placed on each of the shafts 90 between the bearings 83 and 87.

Each upper or drive shaft 90 extends horizontally above one of the tanks 55 and has an upper or drive roller 99 attached thereto. Each upper drive roller 99 is rigidly secured to one of the drive shafts 90 by means of a nut 100 which is screwed onto the end thereof and which clamps the drive roller 99 against a spacer 101, which in turn engages the enlarged portion 93 of the shaft 90. Each drive roller 99 is divided into a plurality of spools 103.

Secured on each drive shaft inside one of the chambers 63 and between spacers 97 is a worm gear 104. Each worm gear 104 is engaged by a worm 105 which is rigidly secured to an impulse wheel shaft 106. Each impulse wheel shaft 106 is supported by a bracket 107.

As best shown in Figs. 2, 4 and 5, each bracket 107 is provided with side flanges 109 which rest on inner parts 110 of upper faces of each shell 61. Screws 113 are provided which secure each of the brackets 107 in place. The opposite ends of each bracket 107 have bearings 114 in which each impulse wheel shaft 106 is journaled, each worm 105 being situated between bearings 114. One end of each of the impulse wheel shafts 106 extends outward from one side of each bracket 107 and an impulse wheel 117 is secured thereto. Each impulse wheel 117 is of a standard construction and is provided with a multiplicity of buckets 118.

Above each impulse wheel 117 in each of the covers 62 is a cylindrical opening 120. Secured to the cover 62 directly above each opening 120 is a nozzle head 121. Each nozzle head 121 has a cylindrical projection 122 which projects into one of the cylindrical openings 120. Formed in the lower part of each nozzle head 121 and extending through each projection 122 is a passage 124. A nozzle 125 is carried by each of the projections 122 in communication with one of the passages 124. Each nozzle 125 extends partially into one of the chambers 63 and is situated in a position directly above an impulse wheel 117. Each passage 124, as best illustrated in Fig. 5, is connected to a lateral passage 127 formed in one of the covers 62. Each of the lateral passages 127 connects to a manifold passage 128 which is also provided in each of the covers 62.

Referring to Fig. 2, each manifold passage 128 connects to the exterior of each cover 62 near the central part thereof, and secured in communication therewith is a return bend 130, each return bend 130 being secured to one of the covers 62 by cap screws 131. The return bends 130 are placed so as to extend to the back of the film-handling units 57 and the inner ends thereof are connected to hose 132. Referring to Fig. 1, each hose 132 is connected to a vertical liquid feed pipe 134, each having a valve 135 which controls a flow of liquid through the hose 132. The vertical liquid feed pipes 134 connect to a main liquid feed pipe 136 which extends below the floor and which is provided with a main valve 137. The hose 132 are provided so as to eliminate any rigid connection of the film-handling units, and thus permit them to be elevated out of the tanks 55 for the purpose of threading the film through these units, and for inspection or repair of film-handling units.

When the main valve 137 and the valve 135 are opened, liquid, which is preferably oil under pressure, is delivered through the hose 132 to the manifold passage 128 of the film-handling units 57. The liquid passes therefrom through the lateral passages 127 and through the nozzles 125 in the form of jets which impinge against the impulse wheels 117 and cause them to rotate. In this manner the drive rollers of the film-handling units are operated through the interconnecting parts.

The rate of rotation of the drive rollers depends upon the torque exerted by the impulse turbines, which in turn depends upon the character of the jets impinging against the impulse wheels 117. Each of the impulse turbines is therefore provided with a control valve 140 which is carried in certain of the nozzle heads 121. Each control valve has a needle 141 which extends downward through one of the passages 124 and into one of the nozzles 125. Each control valve 140 also has an upper cylindrical body 143 which rests in a vertical cylindrical opening 144 of each of the nozzle heads 121.

We have found that it is not necessary to govern each of the impulse turbines by the tension of the film, and we therefore show alternate valves which are "fixed" and alternate valves which are "governed".

The fixed valves of the invention, as best shown in Fig. 6, each have an enlarged threaded portion 146 formed near the upper end which is screwed in an upper threaded cavity 147 formed at the upper end of each of the nozzle heads 121 and at the upper end of the cylindrical opening 144 thereof. Each of the fixed nozzles is provided with an upper threaded stem 148, above the enlarged threaded portion 146, on which a lock nut 149 is secured. Each lock nut 149 engages an upper end of one of the nozzle heads 121 and thus locks the fixed control valve in place. The upper end of each of the nozzle heads 121 is provided with a cover 157 and each cover 157 conceals the upper end of each control valve and lock nut 149. The fixed valves are manually adjusted so that a mean rate of speed of the fixed impulse turbines is acquired.

The governed control valves are typically shown best in Figs. 5 and 6. The cylindrical body 143 of each control valve 140 which is governed, is provided with a horizontal slot 150 in which a cam 151 rests, each cam 151 being formed on the inner end of a horizontal shaft 152. Each shaft 152 extends through a bearing opening 153 of a bearing member 154. Each bearing member 154 is provided with an inner threaded plug 155 which extends into a threaded socket 156 provided by each nozzle head 121. The nozzle heads 121 of the fixed nozzles have the threaded sockets 156 thereof closed by a plug 158, since the governor mechanisms are eliminated therein.

Secured to the outer end of each shaft 152 is a governor arm 159 from the outer end of which a shaft 160 extends. On each shaft 160 there is a governor spool 162 which is rotatable thereon. A coil spring 164 surrounds a part of each of the bearing members 154. The inner end of each of the coil springs 164 engages a pin 167 supported by a bearing member 154, and the outer end of each coil spring 164 engages a pin 168 which is supported by a lug 169 of each of the governor arms 159. Each coil spring 164 is for the purpose of resiliently raising the governor arm into the highest position.

When the governor arms 59 are in their highest position the cams 151 are in such a position that the control valves 140 associated therewith are raised and there is therefore a maximum jet of liquid flowing through each of the nozzles 125, and each of the impulse wheels 117 is being driven at its maximum torque. When the governor arms 159 are in their lowest position, the cams 151 are in such positions that the valves 140 are in their lowermost position. At this time there is a minimum sized jet flowing through each of the nozzles 125 and therefore each of the impulse wheels 117 is being driven at a minimum torque. The manner of controlling the different positions of the governor arms 159 will be explained hereinafter.

Since it is necessary to quite accurately govern the speed of the governed impulse turbines, it is necessary to preserve the valve seat 166 provided at the lower ends of each of the nozzles 125. It is therefore necessary to prevent the lower ends of the needles 141 from pressurably engaging these seats 166 and this is done by means of the construction which is best shown in Fig. 5. The upper ends of the governed control valves 140 are also provided with the threaded cavities 147 into which stop pins 170 are screwed. Each stop pin 170 is slotted as indicated at 171, and the lower ends thereof are expanded so that when it is screwed into a cavity 172 there will be a resilient pressure thereof against the walls of this cavity, this pressure tending to prevent the pins 170 from rotating and getting out of adjustment. Screwed into the threaded socket 147 of the nozzle heads 121 in which each of the governed control valves is situated is a stop 173, the upper part of which may be engaged by a head 174 formed at the upper end of each of the stop pins 170. Each pin 170 is adjusted so that the head thereof may engage one of the stops 173 just before the pin of the associated control valve comes into engagement with one of the valve seats 166.

Each of the film-handling units also includes a cradle 175. Each cradle 175 includes a plurality of horizontally extending bars 176 which extend below certain of the drive rollers 99. Each horizontal bar 176 extends into a socket 177 formed on the front wall 78 of each of the turbine cases 60. Placed on each bar 176 at the opposite ends thereof are brackets 179 which are spaced apart by means of a tubular spacer 180 which surrounds one of the horizontal bars 176. Connected to the pairs of brackets 179 are pairs of vertical cradle bars 181, the lower ends of which bars 181 are connected by plates 183 to horizontal side bars 184. The horizontal side bars 184 are retained in proper spaced relationship by cross bars 185 which have tongues 186 extending through openings provided therein. Extending through the outer ends of the tongues 186 are pins 187 which lock the side bars and cross bars together. Extending between and secured to the side bars 184 of each of the cradles 175 are lower shafts 189, each of which carries a lower or driven roller 190. Each of the driven rollers 190 consists of individual lower or driven spools 191 adapted to individually rotate on the lower shaft 189. The cross bars 185 of the cradles 175 carry longitudinal film guides 193 which extend in positions directly adjacent to adjacent parts of the individual spools 191.

The film 44 passes to the wet box 30 and extends over the first governor spool 162. The film extends from the first governor spool 162 to the first drive roller 99 and then to the first driven roller 190. The film is wrapped around the consecutive spools 103 and 191 of the first series of upper and lower rollers 99 and 190 in the form of loops 200. The film passes from the first series of upper and lower rollers directly to the second series of upper and lower rollers as illustrated best in Fig. 2. The film is wrapped around the second series and then passes over the governor spool 162 of the second governor, and then to a third series of upper and lower rollers. It should be noted that there is one governor mechanism for every two series of upper and lower rollers. Therefore, we may consider the upper and lower roller combinations as being in pairs, each of which is provided with a governor mechanism.

In explaining the operation of the governor mechanism shown best in Fig. 2, we will number the first governor mechanism 201, the second governor mechanism 202, and the third governor mechanism 203. The first series of upper and lower rollers will be numbered 205, the second series will be numbered 206, the third series 207, the fourth series 208, and the fifth series 209. As previously explained, the governor mechanism is provided for the purpose of maintaining the film at a normal tension regardless of the speed at which it is fed to the machine and regardless of the stretch and shrink of the film.

The operation is substantially as follows:

If the tension in the first series 205 decreases, the governor arm 159 of the first governor mechanism 201 moves upward, and as previously explained this will raise the control valve connected therewith in a manner to increase the torque or driving power of the impulse turbine associated therewith. This tends to drive the upper roller or drive roller of the first series 205 at a higher rate of speed and consequently the film is taken by this series 205 at a speed commensurate with the feed of the film thereto, and the tension at this time will be returned to normal and the first governor mechanism 201 will be returned to normal position.

When the first series of rollers 205 is accelerated in speed, the film is fed at a higher rate of speed to the second series 206 and the tension therein is reduced. The governor arm 159 of the second governor mechanism 202 at this time is permitted to raise, and the control valve associated with this governor arm is operated so as to speed up the operation of the third impulse turbine. This causes the drive roller of the third series of rollers 207 to operate at a higher rate of speed, and relieves the second series of rollers 206 of any pull, thereby speeding it up, which allows the tension of the film around the second series of rollers 206 to return to normal. The fourth and fifth series of rollers and the third governor mechanism are affected in the same manner as the second and third series of rollers 206 and 207, and the second governor mechanism 202 is affected when the tension in the first series of rollers is decreased.

When the tension in the first series of rollers 205 increases, the arm of the first governor mechanism is lowered and the control valve associated therewith is moved into position to restrict the flow of fluid, and the impulse turbine is run at a slower rate of speed. Therefore, the series of rollers 205 decreases in speed and permits the tension thereof to return to normal. When the speed of the first series of rollers 205 is decreased, the film is fed at a slower rate of speed to the second series of rollers 206 and therefore the tension will increase and the governor arm of the second governor mechanism 202 will be depressed. This will slow the third series of rollers 207 and will affect the second series 206 in such a manner as to slow up the speed and return the film tension thereof to normal. The following series of rollers are affected in the same manner as the second series of rollers 206 is affected when the tension in the first series 205 increases.

The film passes from the film-handling unit of the first tank 55 to a film inspection device which is indicated by the numeral 31 of Fig. 1. This device forms no part of the present invention.

The film 44 passes from the inspection device 31 to the film-handling unit 57 of the next tank 55 of the wet box 30. The construction of the second wet box and the film-handling unit is substantially the same as the first one just described, and therefore a detailed description thereof is unnecessary. The film passes from the second film-handling unit of the wet box to a suitable drying means.

In putting the machine into operation the first time, it is necessary to thread a leader film through the entire apparatus. This leader film consists of a piece of film which is used solely for the purpose of guiding the other film through the apparatus when the machine is first started up. The leader film may be readily threaded around the branding machine and brake 27, the film take-up 28 and the film speed regulator 29. In order to thread the leader film on the film-handling units 57 it is necessary to elevate these units so that access may be had to both the upper and lower rollers. The film-handling units 57 are elevated by means typically illustrated by hydraulic jacks 215 having rods 216 which are provided with hooks 217 at the lower ends thereof. These hooks 217 engage eyes 218 provided on each of the cases 60. The hydraulic jacks 215 are capable of operation in a manner to lift the film-handling units 57 so that the lower rollers thereof are placed above the tanks 55 and so that the leader film may be easily threaded therearound. The purpose of telescoping the drain tubes inside the drain pipes and the purpose of providing the flexible hose 132 is for permitting the film-handling units to be elevated as just described. The film is then threaded around the consecutive spools of the upper and lower rollers and around the governor spools of the first film-handling unit 57. It is then passed to the inspection device 31 and around the various spools of the next film-handling unit 57. The film-handling units 57 are then lowered into proper position inside the tanks 55 by actuating the hydraulic jacks 215.

The film to be developed is then connected to the rear end of the leader film, and the apparatus is then set into operation. The valves 135 and 137 are opened to supply liquid under pressure to the impulse turbines. This liquid, as previously explained, is preferably in the form of an oil and at a pressure of about 25 pounds per square inch. The motor 50 of the film feed regulator is energized at this time and the whole apparatus begins to operate. When the first part of the film 44 passes from the first tank 55 of the wet box 30, the frames thereof may be inspected at the inspection device 31 so as to determine whether or not the film is being properly developed. If the film is being slightly over-developed or under-developed, the speed of the motor 50 may be varied, as previously explained, so as to operate the film feed regulator at an appropriate rate of speed. If the film is to be fed faster, the film feed regulator is speeded up. This will speed the film-handling units 57. When the film is being fed faster than what may be termed a normal speed, the governor spools position themselves higher than normal so that the control valves associated therewith will open more and allow a larger jet of liquid to pass through so that the turbine motors operate at a higher rate of speed. When the film is traveling slower than normal, the governor spools are in a lower position and the valves are closed more than normal so that the impulse turbines operate at a lower rate of speed.

It should be clearly understood that the feature of positively driving the drive rollers by individual means is very important. It has been pointed out that where the drive rollers were driven by friction means, the tension of the film was not accurately maintained at a normal tension. It should be quite clear from the foregoing description that a positive and separate drive means for each drive roller will permit an absolute and accurate control of the film and it will be possible to positively keep the film at the desired tension.

The use of an impulse turbine for operating the drive rollers is also very important to the invention. An impulse turbine is susceptible of being very accurately controlled and is therefore sensitive and quick to respond to any variation in the tension of the film. The governor means applied to certain of the impulse turbines is very important as a medium whereby the governed impulse turbines are operated in accordance with the tension of the film.

We claim as our invention:

1. A film feeding apparatus consisting of: a series of drive rollers; a series of driven rollers, there being a film wound on said drive and driven rollers; and turbines for driving each of said drive rollers.

2. A film feeding apparatus consisting of: a series of drive rollers; a series of driven rollers, there being a film wound on said drive and driven rollers; and individual turbines for positively driving each of said drive rollers.

3. A film feeding apparatus consisting of: a series of drive rollers; a series of driven rollers, there being a film wound on said drive and driven rollers; and impulse turbines for driving each of said drive rollers.

4. A film feeding apparatus consisting of: a drive roller; a driven roller, there being a film adapted to be wound on said drive and driven rollers; a turbine connected to and adapted to drive said drive roller; and a governor operated by said film in response to tension variations thereof for governing the operation of said turbine.

5. A film feeding apparatus consisting of: a drive roller; a driven roller, there being a film adapted to be wound on said drive and driven rollers; an impulse turbine connected to and adapted to drive said drive roller, and a governor operated by said film in response to tension variation thereof for governing the operation of said impulse turbine.

6. A film feeding apparatus consisting of: a drive roller; a driven roller, there being a film adapted to be wound on said drive and driven rollers; an impulse turbine connected to and adapted to drive said drive rollers, said impulse turbine having an impulse wheel and a valve for regulating the jet of liquid impinged on said impulse wheel; and a governor connected to said valve, said governor being operated by said film in response to tension variations thereof in a manner to govern the position of said valve.

7. A film feeding apparatus consisting of: a drive roller; a driven roller, there being a film adapted to be wound on said drive and driven rollers; an impulse turbine connected to and adapted to drive said drive roller, said impulse turbine having an impulse wheel and a valve for regulating the jet of liquid impinged on said impulse wheel; a governor connected to said valve, said governor being operated by said film in a manner to govern the position of said valve; and means for preventing said valve from pressurally engaging a seat provided therefor.

8. A film feeding apparatus consisting of: drive rollers; driven rollers, there being a film adapted to be wound on said drive and driven rollers; a plurality of individual fixed means for driving part of said drive rollers; a plurality of individual governed means for driving other of the said drive rollers; and a governor for each of said individual governed means operated by said film in response to tension variations thereof and adapted to govern the operation of each of said individual governed rollers.

9. A film feeding apparatus consisting of: drive rollers; driven rollers, there being a film adapted to be wound on said drive and driven rollers; a plurality of individual fixed means for driving part of said drive rollers; a plurality of individual governed means for driving the remainder of said drive rollers; and a governor for each of said individual governed means operated by said film in response to tension variations thereof and adapted to govern the operation of each of said individual governed rollers.

10. A combination as set forth in claim 8 in which said individual fixed and governed means consist of turbines.

11. A combination as set forth in claim 8 in which said individual fixed and goverened means consist of impulse turbines.

12. In a film feeding machine, the combination of: roller means over which the film is passed and by which the film is driven; a prime mover for driving said roller means;

means for placing a tension on said film; and means operative in response to variation in tension of said film for regulating the energy applied to said prime mover.

13. In a film feeding machine, the combination of: a roller means over which the film is looped and by which the film is driven; a fluid actuated prime mover; means by which said prime mover directly and positively drives said roller means; means for placing tension on said film to hold it taut; and means controlled by the tension on said film for regulating the flow of fluid into said fluid actuated prime mover.

14. A film feeding apparatus consisting of: drive rollers; driven rollers, there being a film adapted to be wound on said drive and driven rollers; fluid-operated mechanism for driving said drive rollers at such a speed as to maintain the tension of said film near normal; a film carrier on which said film is carried; and a film feed regulator through which said film is passed from said film carrier for regulating the rate of feed of said film to said drive and driven rollers.

15. A film feeding apparatus consisting of: drive rollers; driven rollers, there being a film adapted to be wound on said drive and driven rollers; individual turbines for driving said drive rollers at such a speed as to maintain the tension of said film near normal; a film carrier on which said film is carried; and a film feed regulator through which said film is passed from said film carrier for regulating the rate of feed of said film to said drive and driven rollers.

16. A film feeding apparatus consisting of: a plurality of series of film feeding rollers arranged to have wound thereon a strip of film, each series including a drive and a driven roller; a fluid-operated power means for independently driving the drive roller of each series; and a plurality of governor means respectively controlling the feeding torque of certain of said power means and each operated by the film in response to tension variations thereof, whereby an increase in tension, due to shrinkage or other causes, of that portion of the film associated with any series of said rollers will cause retardation of the feed of the film from said series and whereby a decrease in tension, due to stretch or other causes, of said portion of the film will cause an increase of the feed of the film from said series.

17. A film feeding apparatus consisting of: a plurality of series of film feeding rollers arranged to have wound thereon a strip of film, each series including a drive and a driven roller; a fluid-operated power means for independently driving the drive roller of each series; and a plurality of governor means respectively controlling the feeding torque of alternate of said power means and each operated by the film in response to tension variations thereof, whereby an increase in tension, due to shrinkage or other causes, of that portion of the film associated with any series of said rollers will cause retardation of the feed of the film from said series and whereby a decrease in tension, due to stretch or other causes, of said portion of the film will cause an increase of the feed of the film from said series.

18. A combination as set forth in claim 16 in which the several governor means are independently operative to at the same time compensate for increased and decreased tension of different portions of the film.

19. A combination as set forth in claim 17 in which the several governor means are independently operative to at the same time compensate for increased and decreased tension of different portions of the film.

20. A film feeding apparatus consisting of: a plurality of series of film feeding rollers arranged to have wound thereon a strip of film, each series including a drive and a driven roller; a fluid-operated power means for driving the drive roller of each series; and a plurality of governor means respectively controlling the feeding speed of each of said power means, said governor means each being operated by adjacent portions of the film in response to tension variations thereof, whereby the feed of each portion of the film will be in accordance with its respective degree of tension.

In testimony whereof, we have hereunto set our hands at Los Angeles, California, this 1st, day of November, 1927.

FRANK E. GARBUTT.
LEIGH M. GRIFFITH.

CERTIFICATE OF CORRECTION.

Patent No. 1,764,203.                              Granted June 17, 1930, to

FRANK E. GARBUTT ET AL.

It is hereby certified that error appears in the printed specification of the above numbered patent requiring correction as follows: Page 6, line 70, claim 5, for the word "variation" read variations; line 93, claim 7, after the word "film" insert "in response to tension variations thereof"; line 125, claim 11, for the misspelled word "goverened" read governed; page 7, lines 2 and 3, claim 12, for "variation" read variations; and that the said Letters Patent should be read with these corrections therein that the same may conform to the record of the case in the Patent Office.

Signed and sealed this 2nd day of September, A. D. 1930.

M. J. Moore,
(Seal)                                        Acting Commissioner of Patents.